C. A. STREET.
TRANSMISSION DEVICE.
APPLICATION FILED DEC. 23, 1912.

1,128,915.

Patented Feb. 16, 1915.
2 SHEETS—SHEET 1.

WITNESSES:

INVENTOR
Chas. A. Street

C. A. STREET.
TRANSMISSION DEVICE.
APPLICATION FILED DEC. 23, 1912.

1,128,915.

Patented Feb. 16, 1915.
2 SHEETS—SHEET 2.

WITNESSES:

INVENTOR
Chas. A. Street

UNITED STATES PATENT OFFICE.

CHARLES A. STREET, OF ST. LOUIS, MISSOURI.

TRANSMISSION DEVICE.

1,128,915.  Specification of Letters Patent.  Patented Feb. 16, 1915.

Application filed December 23, 1912. Serial No. 738,344.

*To all whom it may concern:*

Be it known that I, CHARLES A. STREET, a citizen of the United States, residing at St. Louis, in the State of Missouri, have invented certain new and useful Improvements in Transmission Devices, of which the following is a specification.

The invention has for an important object to give a construction whereby an internal gear forming an integral part of a wheel hub and extending across the major plane of the wheel, may be utilized.

A further object is to give a construction whereby a driving pinion may be mounted in the journal of the wheel and moved orbitally.

A further important object is to utilize such movement of the driving pinion to control operation of the mechanism in certain particulars.

It is also an aim of the invention to present a practical construction which may be economically produced.

Figure 1:
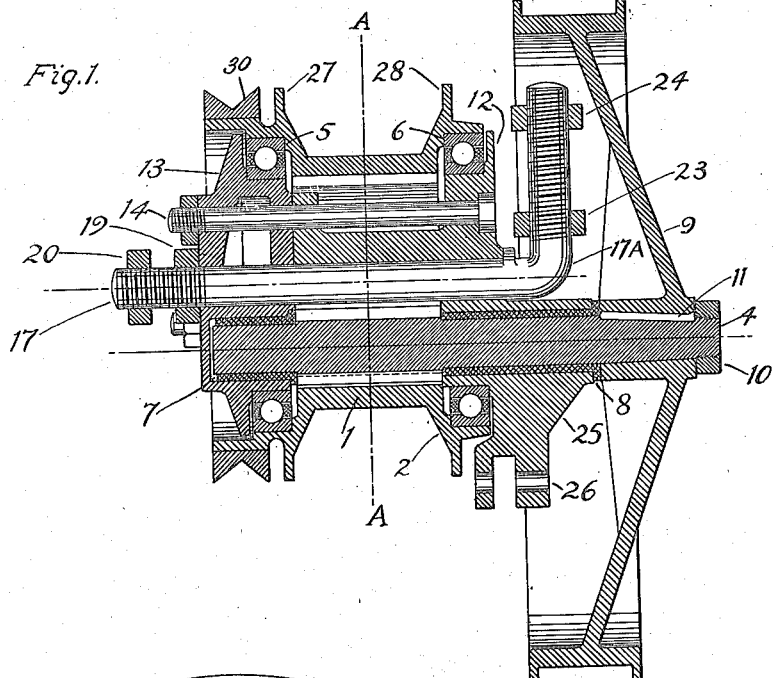
Figure 2:
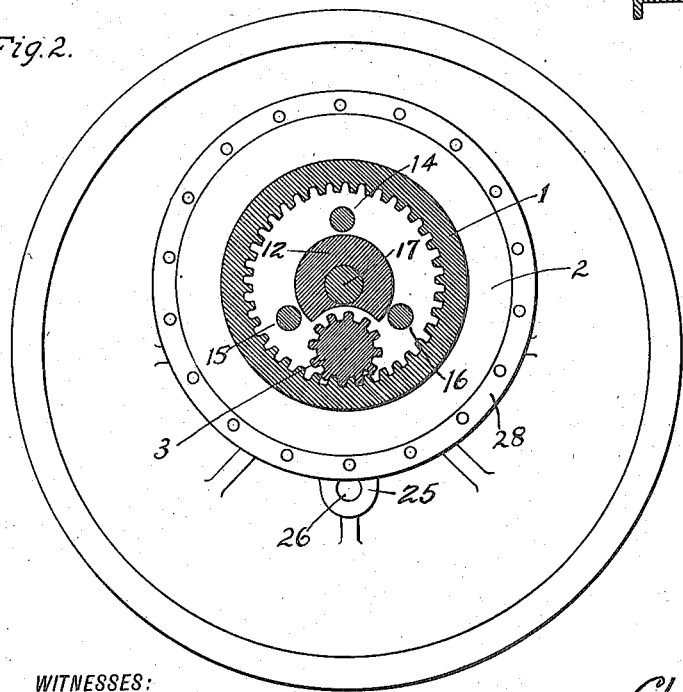
Figure 3:
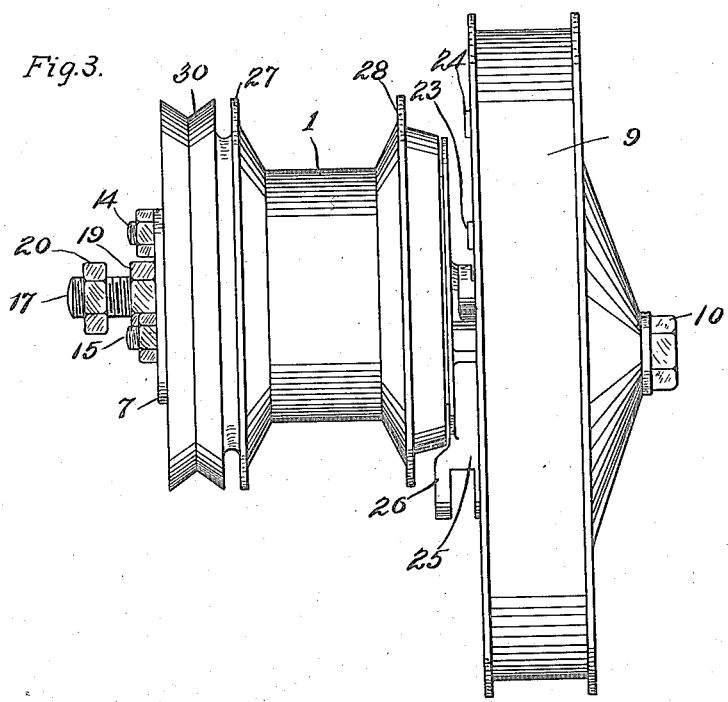
Figure 4:
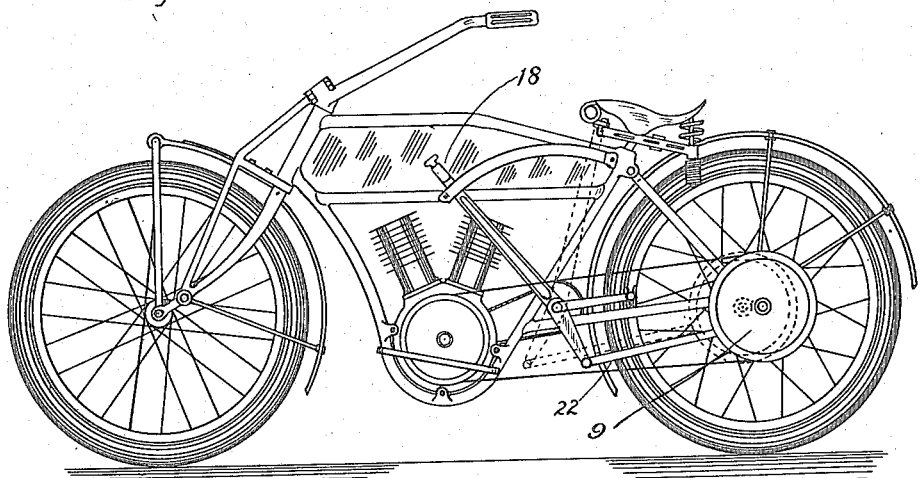

With these and other objects the invention consists of the novel features of construction and combination of parts shown in the annexed drawings, to which reference is hereby made, and in which, Figure 1 is a vertical section coincident with the axis of the wheel, Fig. 2 is a cross section on the line A—A of Fig. 1. Fig. 3 is an elevation of the device, Fig. 4 is an elevation of a motor-bicycle.

There is illustrated a motor-cycle, the rear wheel of which has my invention incorporated therein, the bicycle being otherwise constructed in accordance with practices customary in the art. Carried by the rear forks of the bicycle frame there is a stationary axle 17, one end of which, for mechanical convenience, is bent upwardly at right angles closely adjacent the fork, as at 17ᴬ, the frame being secured on the upturned portion by means of nuts 23 and 24. Revoluble on this shaft between the forks there is a casing formed in two pieces 12 and 13, secured together by means of bolts 14, 15 and 16 having nuts thereon outwardly of one side of the casing, the heads of the bolts being preferably countersunk in the piece 12. The casing is held on the axle 17 by the nut 19, and an outer nut 20 is also provided on the shaft for holding the adjacent fork of the frame upon the shaft. A hub 2 is disposed revolubly around the casing, and suitable ball bearing raceways 5 and 6 are formed between the hub and casing adjacent each side. The hub is provided with the usual spoke attaching flanges 27 and 28. The barrel portion of the hub comprises an internal spur gear 1, concentric with the axle 17, the raceways 5 and 6 being also concentric with the axle. The casing pieces 12 and 13 are provided with bearings 7 and 8 carrying a shaft 4 upon which is the gear 3 meshed with the gear 1, and clearing the axle 17, the body of the casing being cut away to accommodate the gear, as shown. The shaft 4 projects outwardly from the casing at one end, preferably adjacent the upturned end of the axle 17. On the projecting end there is secured a pulley 9 for a friction belt, held by means of the key 11 and nut 10. The casing is provided at one side with an arm 25, which may be connected at 26 to a suitable control lever, through the link 22, shown. The hub may also be provided with a pulley or other driving element 30, directly connected to the hub.

The device being assembled, and the usual driving belt engaged with the pulley 9, so as to be taut when the shaft 4 is located at or near the rear limit of its movement with the casing around the axle 17, it will be seen that when the control lever 18 of the motor-cycle is operated to draw upon the arm 25, which is in this case extended radially outwardly of the shaft 4, the shaft will be moved forward, loosening the belt. Correspondingly, reverse operation of the lever will tighten the belt. The belt engaged with the pulley 9 may be the sole driving belt, or may be supplementary to one engaged with the pulley 30, and separately controlled.

What is claimed:

1. A transmission device for vehicles consisting of a rotary hub having an internal gear, a spur-pinion meshing with said internal gear, a shaft engaged therewith, a pulley secured to one end of said shaft, a sectional casing carrying the shaft, and two bearings between and concentric with said casing and said rotary hub at respective sides.

2. A transmission device for vehicles consisting of a rotary hub, having an internal gear, a sectional casing revolubly engaged with the hub and having an operating arm, a stationary axle concentric with said rotary hub, said sectional casing being mounted on said stationary axle, a driving pinion mounted revolubly in the casing in mesh with the gear, operative connections therefor, and operating means connected to said arm.

3. A transmission device for vehicles consisting of a rotary hub, having an internal gear, a spur-pinion meshed with the gear, a shaft carrying the pinion, a pulley on the shaft, a sectional casing revolubly engaged with the hub and having said shaft eccentrically mounted thereon, an arm extending from said sectional casing, operative connections for said arm, a stationary axle supporting the casing concentrically, and means for attaching said stationary axle to a vehicle.

4. In a transmission device for vehicles, a rotary hub, having an internal gear, a spur-pinion meshed with the gear, a shaft carrying said spur-pinion, a sectional casing revolubly mounted on the hub, said shaft journaled eccentrically in the casing, a pulley secured to said shaft, an arm on said casing, operative connections for said arm, two ball-bearing race-ways, between the hub and casing engaged in the casing and a stationary axle, and means for attaching said stationary axle to a vehicle.

In testimony whereof I hereunto affix my signature in presence of two witnesses.

CHARLES A. STREET.

Witnesses:
Gus. I. Street,
Sallie C. Street.